N. W. L. BROWN.
MACHINE FOR DELINTING COTTON SEED.
APPLICATION FILED MAR. 16, 1908.
997,177.
Patented July 4, 1911.
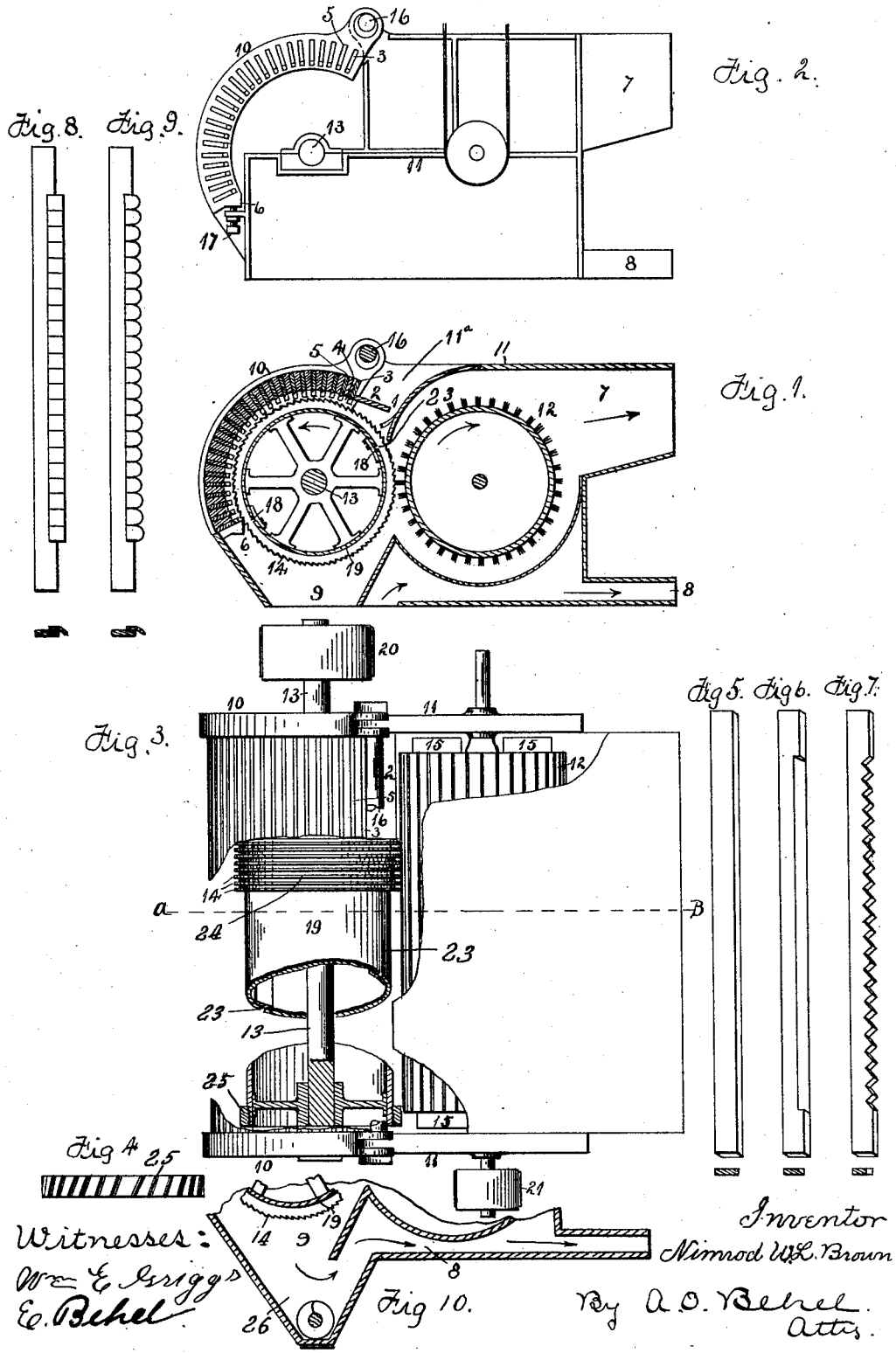

UNITED STATES PATENT OFFICE.

NIMROD W. L. BROWN, OF THOMASVILLE, ALABAMA.

MACHINE FOR DELINTING COTTON-SEED.

997,177.   Specification of Letters Patent.   Patented July 4, 1911.

Application filed March 16, 1908. Serial No. 421,554.

*To all whom it may concern:*

Be it known that I, NIMROD W. L. BROWN, a citizen of the United States, residing at Thomasville, in the county of Clarke and State of Alabama, have invented certain new and useful Improvements in Machines for Delinting Cotton-Seeds, of which the following is a specification.

The invention, as stated, relates to machines for delinting cotton seeds, from which, as is well known, it is desirable to remove the lint prior to their treatment in oil mills, for the reasons, first, that the presence of a large amount of lint on the seeds will cause the absorption and retention of an excessive quantity of oil in the cake, and, second, the lint which is removed from the seeds has a marketable value.

The "linter" machine, now commonly in use, is modeled somewhat closely after the cotton gins of the Whitney type, embodying a roll box to which the feeder delivers the seeds, and in which roll box the seed roll, or mass of seeds revolves in such a manner that each seed passes around and around in the seed roll until delinting is finally accomplished, the seed losing its cohesion in the mass of the revolving seed roll, and falling out through a finger-board at the bottom of the roll box. One great defect with this type of machine is that the seed roll revolves with much friction against the whole interior surface of the roll box, while the saws occupy only a very small space within the roll box. Another defect with this type of machine is that it discharges the delinted seeds in such an erratic manner that a positive feeder cannot be used on the machine, but an intermittent, and complicated feeder has to be used instead. Again, the machine as now commonly used, is subject to great danger from accident due to nails or other foreign particles, which may be fed in with the seeds, getting across the ribs where the saw teeth pass out of the roll box. Still another defect arises from the fact that saws in the present type of machine pull much dust and trash through the ribs along with the lint, on which account it is difficult to properly clean the lint.

In the machine which I have invented, and which I will now proceed to describe in detail, I have eliminated the roll box with its dead friction surfaces; I pass the seeds in positive progression through the machine, and discharge them in a positive manner; I have arranged so that nails or other foreign matter may pass through my machine without injuring the machine; I have provided a means for separating motes, dust and other foreign matter from the lint. I have provided a means for separating motes, dust and other foreign matter from the delinted seeds, as they pass from the delinting mechanism proper. I have done this, to state the matter briefly, by providing a saw cylinder, with which coöperates a delinting breast of novel construction, a brush cylinder, and a fan,—and one embodiment of my invention is illustrated in the drawings.

Figure 1 is a longitudinal sectional view on the line *a*—B of Fig. 3. Fig. 2 is a side view of the machine. Fig. 3 is a plan view of the machine, parts being broken away for clearness of illustration. Fig. 4 is a detail view of one of the seed returning rings of the saw cylinder. Figs. 5, 6, 7, 8 and 9 are views of different forms of breast blades, to which reference will be made hereinafter. Fig. 10 is a detail sectional view, showing the connection below the floor line, between the discharge box 9 in Fig. 1 and the seed conveyer.

Referring to the drawings by numerals, like numbers indicating like parts in the several views, it will be seen that the machine comprises a housing or casing 11, which, as shown in the sectional view, Fig. 1, comprises essentially two chambers, one for the saw cylinder, to be hereinafter described, and the other for the brush cylinder, to which reference will be made. The housing 11 is provided in its upper part with a hopper 11ª, to which the seeds may be delivered in any suitable manner and having a feed opening or inlet 1 at its lower end. The feed inlet 1 delivers directly to the saw cylinder, a spatter board 2, preferably adjustably mounted, forms the bottom of the hopper 11ª and one edge of the inlet and prevents the throwing off of the seeds from the saw cylinder as they first come in contact with the saw cylinder.

The saw cylinder is embraced on substantially its upper half by an adjustable breast, comprising a series of delinting blades, 3, arranged in an arc, preferably concentric with the axis of the saw cylinder, and between which are spaces or pockets 4, as shown in Fig. 1, where it will be seen that the delinting blades 3 and 5 at the upper end of the breast, have between them a space indicated at 4. The lower end or bottom 6 of the breast rests upon adjustable set screws 17, by means of which this bottom end of the breast may be adjusted; and the upper end of the breast is adjustable by means of a pair of eccentrics mounted on the shaft 16, and engaging the end castings 10 provided with radial slots, in which the ends of the delinting blades enter and are adjustable.

The saw cylinder is made up of a shaft 13, carrying spiders and the drum 19, upon which the saw blades, or saws are mounted. The said saws 14 are preferably formed of thin steel rings, having on their outer peripheries the usual saw teeth, and being provided on their inner edges with tongues 18 which engage grooves 23, as shown in Figs. 1 and 3, to prevent the saws from rotating idly on the drum, and these saws 14 are preferably separated by spacing rings 24, which are of sufficient width radially to extend nearly to the bases of the saw teeth. The saws and spacing rings, which go to make up the saw cylinders, are held upon the drum 19 in any suitable manner, as by means of the screw rings 25, threaded to the ends of the drum 19, and preferably the rings 25 will, as shown in Fig. 4, be provided with oblique ridges, which will turn back any endwise moving seeds into the range of the saw teeth.

It will be observed, on reference to Fig. 1, that the delinting blades 3 and 5 have pockets between them, and that the interior edges of these blades extend nearly to, but do not touch or overlap the saw teeth;—so that between the saw teeth and the inner edges of the delinting blades there is a clear space of arc like form, extending from the inlet 1 to the lower end of the breast 6, the thickness of this clear space is dependent, of course, upon the adjustments of the breast.

The delinting blades may take various forms, that shown in Fig. 5 being a plain rectangular blade of comparative rigidity, that shown in Fig. 6 having its active edge beveled or inclined, the form found in Fig. 7 being notched, that disclosed in Fig. 8 having an elastic or flexible active edge, made up of a plurality of independent spring leaves, while that shown in Fig. 9, and which illustrates the preferred form, shows the independent spring leaves, reduced in width at their flexible ends, so as to give a notched formation; and in arranging in the breast the delinting blades shown in Fig. 9, each succeeding blade should be offset with respect to its neighbor, so as to break joints, or stagger the notches for a purpose which will presently appear.

With this construction, the action of the seeds will be substantially as follows: As the seeds pass to the saw teeth from the inlet 1 they are caught and carried upward into the breast, those which are thrown off by the cylinder at the inlet striking against the spatter board 2 and rebounding forward and passing into the breast. The seeds, in passing under the first delinting blade, are forced into close contact with the saw teeth; passing said blade the seeds enter the first pocket, thence under the second delinting blade, to be released into the next pocket and so on, thus positively working their way through the breast from the inlet 1 to the discharge end of the breast 6. Under this action it is designed that the seeds shall have been completed delinted by the time they are discharged at 6.

The elastic edges of the delinting blades are of value in that they readily adjust themselves to wide variations in the flow of the seeds through the machine, and they permit nails, or other foreign matter to pass through the machine without breaking the teeth of the saw cylinder.

As shown in Figs. 1 and 2, it will be observed that the delinting blades 3 and 5 are capable of individual adjustment in the end castings for the purpose of taking up wear, or otherwise properly adjusting the blades to the work they are doing. The slots in these end castings are longer than the width of the blades so as to permit of such adjustment, and any suitable means for locking the blades in place may be adopted.

The cotton which is carried around by the teeth of the saw cylinder is taken off by the usual rotary brush cylinder 12, and passes out through the flue 7, to a condenser or other suitable receptacle.

As the seeds leave the bottom of the breast at 6 (see Fig. 1), they fall through the discharge box 9 to a suitable conveyer box 26 (see Fig. 10) and this box 26 communicates with a dust flue 8 (see Figs. 1 and 2) which is subjected to suction by any suitable means, so that a suction action is set up across the path of the seeds falling through the discharge box 9. This results in the removal of the light materials falling through the discharge box 9 with the seeds, since it is required that the suction shall be of the proper intensity to remove the light motes, and trash, and still not disturb the sound seeds.

It will be seen that gravity and centrifugal force combine to remove the trash, and dust from the lint which is being carried around by the saw cylinder.

The saw cylinder and the brush 12 will, of course, be rotated or driven in any suitable manner, as by the belts and pulleys 20 and 21, and the brush 12 will, as is customary in this type of machine, be provided with the fan blades 15 at each end, to create the necessary current of air to properly carry off the cotton.

The spaces between the delinting blades, as shown in Figs. 1 and 3, are filled in with wedge-shaped blocks, preferably of wood.

Such mechanical variations from the structure herein shown and described as are obvious equivalents are, of course, within the purview of my invention, and I do not therefore limit myself to the mere details of construction shown and described, except in so far as I am limited by the art to which the invention belongs.

Having thus fully described my invention, I claim,—

1. In a machine of the class described, in combination, a saw cylinder, a breast encircling a portion of said cylinder, and flexible obstructing blades with notched interior edges within said breast.

2. In a machine of the class described, in combination, a saw cylinder, a breast encircling the upper portion of said cylinder, and flexible obstructing blades with notched interior edges within said breast.

3. In a machine of the class described, in combination, a saw cylinder, and a breast encircling a portion of said cylinder, said breast comprising a plurality of radially disposed obstructing blades, and separating strips between said blades.

4. In a machine of the class described, in combination, a saw cylinder, and a breast encircling a portion of said cylinder, said breast being formed of a plurality of radially disposed obstructing blades, separating strips between said blades and end plates in which said blades and strips are fastened.

5. In a machine of the class described, in combination, a saw cylinder, a breast encircling the upper portion of said cylinder, and flexible obstructing blades with notched interior edges within said breast, the notches of one obstructing blade being in different planes of rotation from the notches of an adjacent blade.

6. In a machine of the class described, in combination, a delinting cylinder, a concave breast, embracing the upper part of said cylinder, delinting blades projecting inwardly in radial lines from said breast, a hopper having a feed inlet delivering above the horizontal central plane of said cylinder, and a board forming the bottom of the hopper, extending from the breast over the cylinder rearwardly to form one edge of the feed inlet.

7. In a machine of the class described, in combination, a delinting cylinder, a breast embracing a portion of said cylinder, a series of obstructing blades within said breast, each of said obstructing blades having its seed engaging edge made up of a series of independent spring blades, said independent spring blades being separated from each other slightly in a longitudinal way.

8. In a machine of the class described, in combination, a cylinder provided with a plurality of spaced annular saws, a concave breast embracing said cylinder, and blades having free flexible edges projecting radially from said breast toward said saw cylinder and coöperating therewith, said blades being slightly spaced from one another and with their edges nearly in contact with said cylinder.

9. In a machine of the class described, in combination, a delinting cylinder, and a breast encircling the upper portion of said cylinder, said breast comprising a plurality of radially disposed seed obstructing spring edged blades and separating strips between said blades and narrower in a radial direction to form seed receiving pockets on the inner surface of the breast.

10. In a machine of the class described, in combination, a saw cylinder, a breast, and a plurality of obstructing blades as long as said cylinder connected to said breast and having flexible seed engaging edges projecting inwardly toward said cylinder but out of contact therewith.

11. In a machine of the class described, in combination, a saw cylinder, a breast encircling the upper portion of said cylinder, and radially disposed delinting blades as long as said saw cylinder fastened to said breast and having notched edges projecting inwardly toward said cylinder.

12. In a machine of the class described, in combination, a delinting cylinder, a breast, a series of obstructing blades, each blade having its seed engaging edge made up of a series of independent spring leaves.

13. In a machine of the class described, in combination, a delinting cylinder, a breast, a series of obstructing blades, each blade having its seed engaging edge made of a series of independent spring leaves, the operative ends of which are reduced in width.

14. In a machine of the class described, in combination, a delinting cylinder, a concave breast embracing the upper part of said cylinder, delinting blades projecting inwardly in radial lines from said breast, a hopper having a feed inlet delivering above the horizontal central plane of said cylinder, and a spatter board forming the bottom of the hopper extending from the breast over the cylinder rearwardly to form one edge of the feed inlet.

In testimony whereof I have hereunto set my hand in presence of two subscribing witnesses.

NIMROD W. L. BROWN.

Witnesses:
R. G. HARKNESS,
C. D. RICE.

Copies of this patent may be obtained for five cents each, by addressing the "Commissioner of Patents, Washington, D. C."